May 12, 1931.                H. A. KNOX                1,804,470
                    ENDLESS BAND TRACK FOR VEHICLES
                   Filed May 18, 1929      2 Sheets-Sheet 1
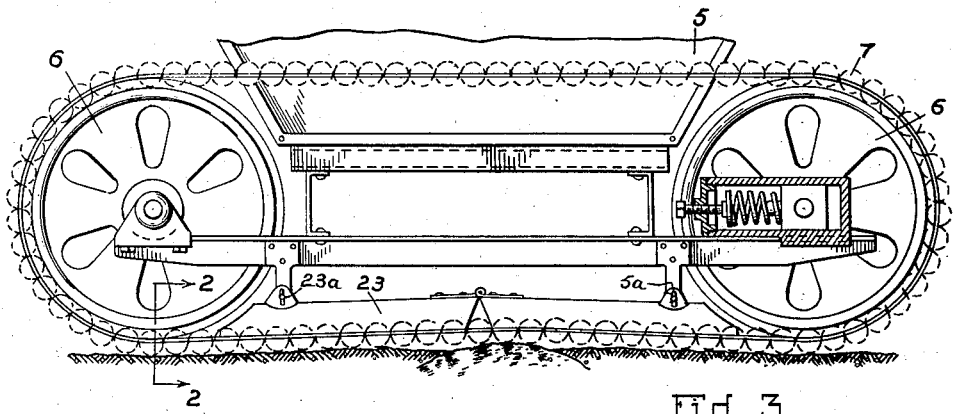
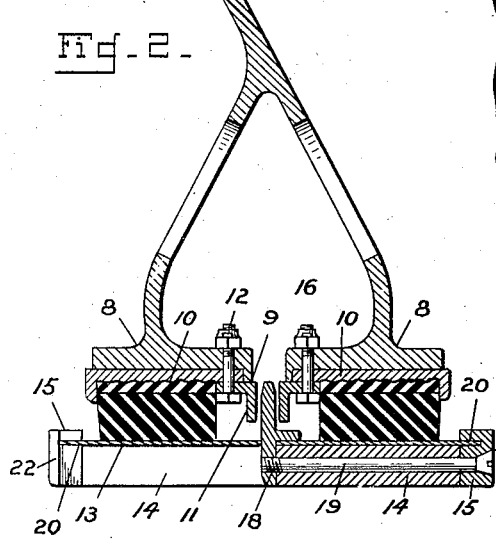
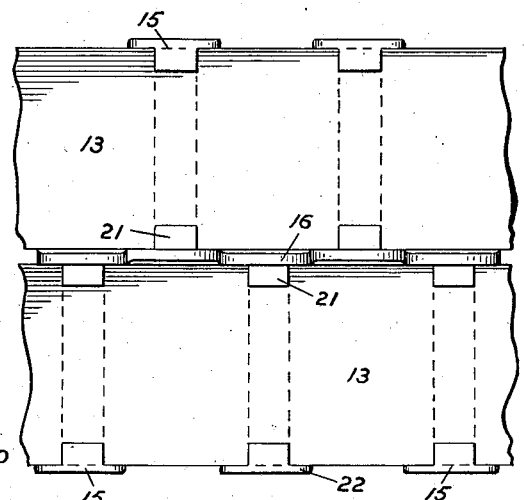
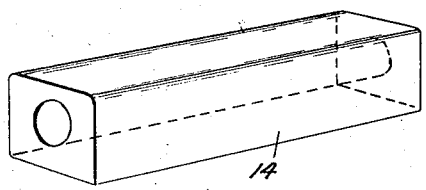
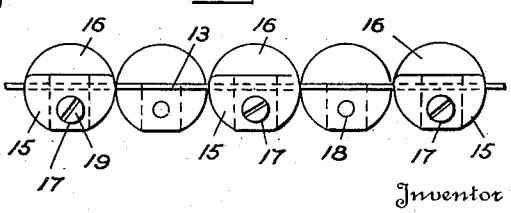
Inventor
Harry A. Knox
By W. N. Roach
Attorney May 12, 1931.   H. A. KNOX   1,804,470
ENDLESS BAND TRACK FOR VEHICLES
Filed May 18, 1929   2 Sheets-Sheet 2
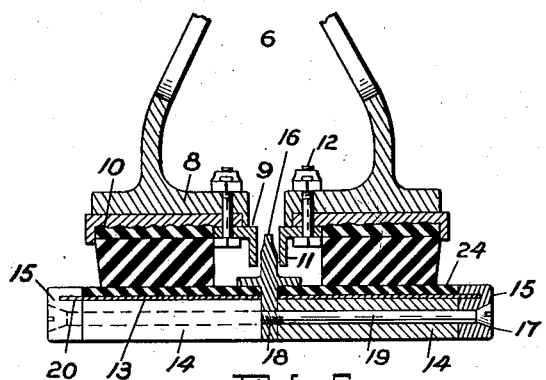
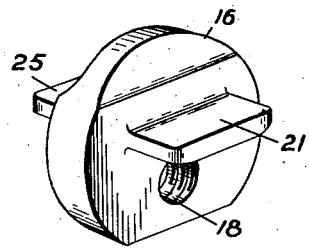
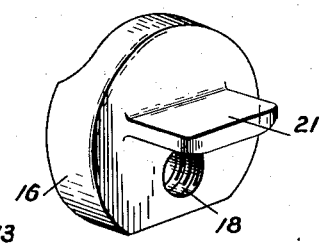
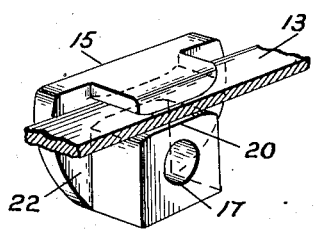
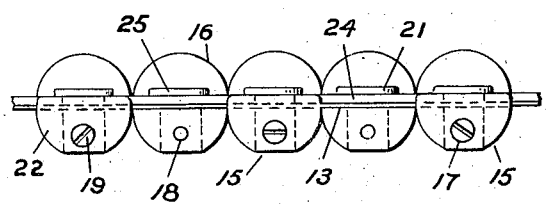
Inventor
Harry A. Knox
By W. N. Roach
Attorney Patented May 12, 1931

1,804,470

UNITED STATES PATENT OFFICE

HARRY A. KNOX, OF DAVENPORT, IOWA

ENDLESS BAND TRACK FOR VEHICLES

Application filed May 18, 1929. Serial No. 364,257.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

This invention relates to an endless band track for vehicles.

Jointless band tracks for vehicles may consist either of a belt of appreciable width or a series of cables of twisted or braided strands. The latter type, after extended trials, has been abandoned due to its inability to withstand the constant bending and all reference to bands appearing hereafter in the specifications will be to the band of the belt type.

Where grousers have been attached to flexible bands by means of securing devices such as bolts which penetrate the band, the opening provided in the band establishes an area of weakness and a center from which radiating cracks develop after only a brief use of the track. To give additional support to this area by increasing the width of the grouser reduces the flexibility below the required degree.

The purpose of this invention is to overcome the foregoing difficulties by attaching the grousers in a novel manner without weakening the band, the attachments cooperating to space grousers placed in staggered relation on adjoining bands. The arrangement provides reduced areas of inflexibility or entirely eliminates them and permits independent movement of the bands with respect to each other and also with respect to the grousers.

With the foregoing and other objects in view, the invention resides in the novel arrangement and combination of parts and in the details of construction hereinafter described and claimed, it being understood that changes in the precise embodiment of the invention herein disclosed may be made without departing from the spirit of the invention.

A practical embodiment of the invention is illustrated in the accompanying drawings, wherein:

Fig. 1 is a view in side elevation of an endless track unit embodying the principles of the invention;

Fig. 2 is a detail sectional view on the line 2—2 of Fig. 1;

Figs. 3 and 4 are respectively an inside plan view and a view in side elevation of a portion of the track;

Figs. 5, 6 and 7 are views similar to Figs. 2, 3 and 4 of a modification of the invention;

Fig. 8 is a perspective of the inside lug shown in Fig. 5;

Figs. 9 and 10 are perspective views, respectively, of the inside and outside lugs of Fig. 2; and Fig. 11 is a perspective of a grouser.

Referring to the drawings by numerals of reference:

There is shown a vehicle 5 having wheels 6 about which is trained an endless ground-engaging track 7. The wheels are formed with divided rims 8, the adjacent sides being provided with flanges 9 for supporting a demountable rubber tired rim 10. The inside marginal portions of the rims 10 are positioned within a guide hoop 11 and both of these elements are fastened to the rim 8 by means of bolts 12. While the rims 8 are described and shown as divided, it is apparent that the same may be made solid without departing from the spirit of the invention.

The track 7 consists of a pair of endless metallic bands 13 (see Fig. 3) on each of which are secured at regular intervals grousers 14 which are preferably in the form of square bars. The distance between the grousers on a band is substantially three times the width of a grouser so that not more than one-fourth of the area of a band will be inflexible. The grousers on the pair of bands are in staggered relation to each other with the result that there is a support for one-half the circumference of the track due to the combined action of the two individual bands.

The attaching means for the grousers are all identical and comprise an outside lug 15 and an inside lug 16 designed to be cut from bar stock and respectively having a countersink 17 and a threaded opening 18 whereby they are secured at each end of the grouser through a bolt 19 passing through the grouser. The outside lug is formed with a slot 20 (Fig. 10) positioned to receive a marginal portion of the band 13. The inside lug is circular and is formed with a single projecting ear 21 (Fig. 9) which, when the lug is assembled overlies the band. The band engaging face of this ear, the faces defining the slot 20 of the outside lug and the inner face of the grouser have rounded edges or corners as best seen in Fig. 10 for the purpose of decreasing the area of inflexibility and to avoid sharp or abrupt flexing of the band. There is, preferably, a slight clearance or vertical play between the bands and the jaws of the grouser so that the bands may actually be flexed within this portion.

The circular formation of the inside lug and the wings 22 established in the formation of the outside lug from bar stock serve to provide an extended lateral engagement with the band to prevent the grouser from assuming an oblique position with respect to the band. The inside lugs on the pair of bands co-act to space the grousers of each band and being circular, permit rolling contact when the track is flexed while permitting independent flexure of each band with assurance that the normal relation between adjoining inside lugs will be correctly restored.

The inside lugs perform a further function in that they project between the spaced guide flanges 11 on the divided rim 8 and hold the band in place about the wheel 6.

Since the grousers are not fixedly clamped to the band, the band may slip circumferentially and this will be of advantage, acting in the nature of a friction clutch when the load is picked up as in starting. This slipping of the band will also constantly present new surfaces for engagement with the grousers and lugs.

Mounted on the frame of the vehicle 5 is a guide rail member consisting of centrally hinged wooden blocks 23 impregnated with oil and having their ends restricted to a limited vertical movement through a sliding connection consisting of a pin 23a carried by a depending portion of the frame 5 and slidable in slots 5a formed in lugs secured to the blocks 23. The adjoining ends of the blocks are scarfed to permit vertical movement between the ends. The guide rail on the lower reach of the track serves to prevent dirt, stones and other impedimenta from gathering on the track and being carried against the rear wheel. It also serves to prevent undue reverse flexure of the bands when passing over obstacles. The guide rail when formed by only one pair of blocks 23 straddles the lugs 16.

In order to maintain the track under tension while allowing for flexing thereof in passing over obstructions, one of the wheels 6 is mounted in any well known manner so as to be capable of limited movement longitudinally of the vehicle.

In the modification shown in Figs. 5 to 8, the structure and arrangement is similar except for rubber belting 24 secured to the inside of the bands 13 and the provision of an additional projecting ear 25 on the inside lug 16. This additional ear is opposite to the ear 21 shown in Fig. 1 and prevents overlapping of the tracks.

I claim:

1. The combination with a vehicle provided with wheels having spaced resilient rims and central spaced flanges, of an endless track tensioned by the wheels and comprising a pair of bands, transverse grousers on the outer tread of each band, said grousers being in staggered relation, and a lug secured at each end of the grousers, the inside lugs enterable between the spaced flanges of the wheels.

2. A track for track laying vehicles comprising a pair of adjoining endless metallic bands, transverse grousers on the outer tread of each band, said grousers being in staggered relation, a lug at each end of a grouser, a bolt passing through the grouser and securing the lugs thereto, the lugs overlying the bands with a clearance across the width of the grouser and the inside lugs being circular and mutually spacing.

3. A track for track laying vehicles comprising a pair of adjoining endless metallic bands, transverse grousers on the outer tread of each band, said grousers being in staggered relation, a lug secured at each end of a grouser, the lugs overlying the band with a clearance across the width of the grouser and having extended lateral engagement with the band and the inside lugs being circular and mutually spacing.

4. A track for track laying vehicles comprising a pair of adjoining endless metallic bands, transverse grousers on the outer tread of each band, said grousers being in staggered relation, a lug secured at each end of a grouser, the inside lugs being circular and mutually spacing.

5. A track for track laying vehicles comprising a pair of adjoining endless metallic bands, transverse grousers on the outer tread of each band, said grousers being in staggered relation, a lug secured at each end of a grouser, the inside lugs being circular.

6. A track for track laying vehicles comprising a pair of adjoining endless metallic bands, transverse grousers on the outer tread of each band, said grousers being in staggered relation, a lug secured at each end of a grouser, the inside lugs being mutually spacing.

7. A track for track laying vehicles including an endless metallic band, transverse grousers on the outer tread of the band, a lug secured at each end of a grouser, the lugs overlying the band with a clearance across the width of the grouser and having extended lateral engagement with the band.

8. A track for track laying vehicles including an endless metallic band, transverse grousers on the outer tread of the band, a lug secured at each end of a grouser, the lugs overlying the band with a clearance between the overlying portions of the lugs and the band.

9. A track for track laying vehicles including metallic bands, transverse grousers on each band, lugs on the ends of the grousers for engaging the band, the inside lug also engaging the adjacent band.

10. The combination with a vehicle provided with wheels having central, spaced flanges on an endless track comprising independent bands trained over the wheels, grousers on the outer tread of each band, lugs on the ends of the grousers and engaging the bands, the inner lugs arranged to be received in the spaced flanges of the wheels.

HARRY A. KNOX.